United States Patent [19]

Hall, Jr.

[11] 3,893,169

[45] July 1, 1975

[54] VIDEO RECORDER WHICH ACCEPTS A PLURALITY OF HORIZONTAL LINE RATES

[75] Inventor: Robert P. Hall, Jr., Auburn, Calif.

[73] Assignee: Arvin Industries, Inc., Columbus, Ind.

[22] Filed: Jan. 29, 1973

[21] Appl. No.: 327,833

[52] U.S. Cl. .............. 360/37; 360/73; 178/69.5 TV

[51] Int. Cl. ......................... G11b 15/46; H04n 5/78

[58] Field of Search ....... 178/6.6 P, 6.6 DD, 69.5 F, 178/6.6 FS, DIG. 24, 6.6 A, 69.5 TV; 318/314, 318; 307/225, 273; 360/37, 73

[56] References Cited

UNITED STATES PATENTS

| | | | |
|---|---|---|---|
| 3,097,267 | 7/1963 | Clark | 178/6.6 P |
| 3,423,524 | 1/1969 | Bradford | 178/69.5 F |
| 3,564,141 | 2/1971 | Hurst | 178/6.6 A |
| 3,636,253 | 1/1972 | Notani | 178/6.6 DD |
| 3,718,754 | 2/1973 | Goshima | 178/6.6 P |
| 3,729,583 | 4/1973 | Yano | 178/6.6 P |
| 3,742,132 | 6/1973 | Sanguu | 178/6.6 P |

*Primary Examiner*—Bernard Konick
*Assistant Examiner*—Alan Faber
*Attorney, Agent, or Firm*—Biebel, French & Bugg

[57] ABSTRACT

A phase locked servo drive for a video recorder is synchronized with horizontal sync information from an incoming video signal. The sync information is divided to a base frequency selected for a tachometer in the servo loop. A monostable multivibrator is used as the divider and is provided with a time constant which will permit it to divide any higher frequency sync signals which are a multiple of the base frequency to the same base frequency. The recorder thus automatically accepts and locks to appropriate horizontal sync from high resolution video signals.

4 Claims, 2 Drawing Figures

VIDEO RECORDER WHICH ACCEPTS A PLURALITY OF HORIZONTAL LINE RATES

BACKGROUND OF THE INVENTION

This invention relates to video recording equipment, and particularly to video recorders which record single frame, video scenes, primarily as individual scenes as opposed to a succession of time related fields which reproduce motion. the most widely used equipment for this purpose comprises some form of magnetic recording disc rotates at a predetermined speed which is related to the frame rate of the video input signal. The signal to be recorded is gated with respect to its synchronizing information such that a single frame, consisting of two interlaced fields and related synchronizing information are recorded on the magnetic disc within a single circular track, during one revolution of the recording disc.

A DC motor is connected to rotate the recording disc and also drives an electronic tachometer which is incorporated in a phase locked servo loop to control the recording disc speed precisely with respect to the synchronizing information of the video signal. During recording the incoming video signal is applied to the recording transducer and also to a conventional sync separator circuit which separates both the vertical synchronizing information, for frame gating purposes, and the horizontal synchronizing information for use in the phase comparator circuit of the servo loop control. The vertical sync information is used to gate ON the video signal to the transducer at the beginning of a field, and to gate OFF this information at the end of the next field, thus recording exactly the video information for two successive interlaced fields making up one frame. This arrangement is used both in recording broadcast television signals and closed circuit video signals, as from closed circuit cameras focused upon a scene. The latter arrangements are used for surveillance, reconnaissance and a number of other well known purposes.

The standards for closed circuit television cameras, as published by the Electronic Industries Association, are different for different types of closed circuit television and for broadcast television signals. For example, the EIA Standard RS-170 for monochrome television studio facilities requires within the vertical blanking interval of a broadcast signal that the usual equalizing pulses and vertical sync pulses all be included during this interval. As is well known this information is used to synchronize the horizontal oscillator circuit of a television receiver operating from the broadcast signal.

There are other standards for closed circuit monochrome television. For example, EIA Standard RS-330 for closed circuit television provides the performance standards for a camera operating at 525 lines per frame, interlaced 2:1, giving resolution the same as the standard broadcast television signal.

Similarly, a separate EIA Standard RS-343-A applies to high resolution monochrome closed circuit television cameras which operate in the range of 675 to 1023 scanning lines with a 60Hz field rate, interlaced 2:1. Many such cameras operate at a line rate of 875.

SUMMARY OF THE INVENTION

It is desirable to provide in video recording equipment a synchronized drive system which will respond to the sync information from different forms of input such as the standard and the high resolution closed circuit television camera mentioned above. The recording equipment adapts automatically to the different line rate requirements, in order to eliminate the possibility of operator error in selecting the proper line rate.

In accordance with the invention a tachometer driven by the drive motor of a video recorder has a pulse rate chosen as an integral submultiple of the standard broadcast line rate of 525 lines per frame. In an embodiment successfully employed, the tachometer output frequency at synchronization is 5250Hz. The horizontal synchronizing information is separated by a conventional sync separating circuit and applied to a phase detector circuit which, together with the tachometer and a controlling amplifier, forms with the motor a closed servo loop to phase lock the drive motor to the incoming video signal.

The separated horizontal sync information is divided down to 5250Hz by a divider circuit arrangement which comprises a monostable multivibrator circuit having a predetermined time constant. This time constant is chosen such that the frequency output of the divider to the phase detector circuit will be the quotient of the horizontal sync signal divided by an integer, in the stated case the integer 3. Any higher horizontal sync information will also be divided by this circuit to the same frequency output, so long as such higher frequency is the product of the desired comparison frequency and an integer. In the particular case, a high resolution video camera having a line rate of 875 lines per frame will produce horizontal sync information that can likewise be divided to 5,250 Hz by the same monostable multivibrator circuit. Thus, when a high resolution closed circuit camera is connected to the input of the recorder, this has no effect upon the motor control servo, and the recorder automatically locks to the sync information of the incoming video signal.

Accordingly, the primary object of this invention is to provide video recording equipment, particularly of the single frame or single field type, which incorporates a phase locked servo loop control for driving the recording media, and which is capable automatically of locking to sync information derived from standard video format signals, such as the U.S. standard of 525 lines/frame, and also capable automatically of accepting and locking to high resolution video signals with sync information at a higher but related rate such as 875 lines/frame.

Other objects and advantages of the invention will be apparent from the following description, the accompanying drawing and the appended claims.

DESCRIPTION OF THE PREFERRED EMBODIMENT

Figure 1:
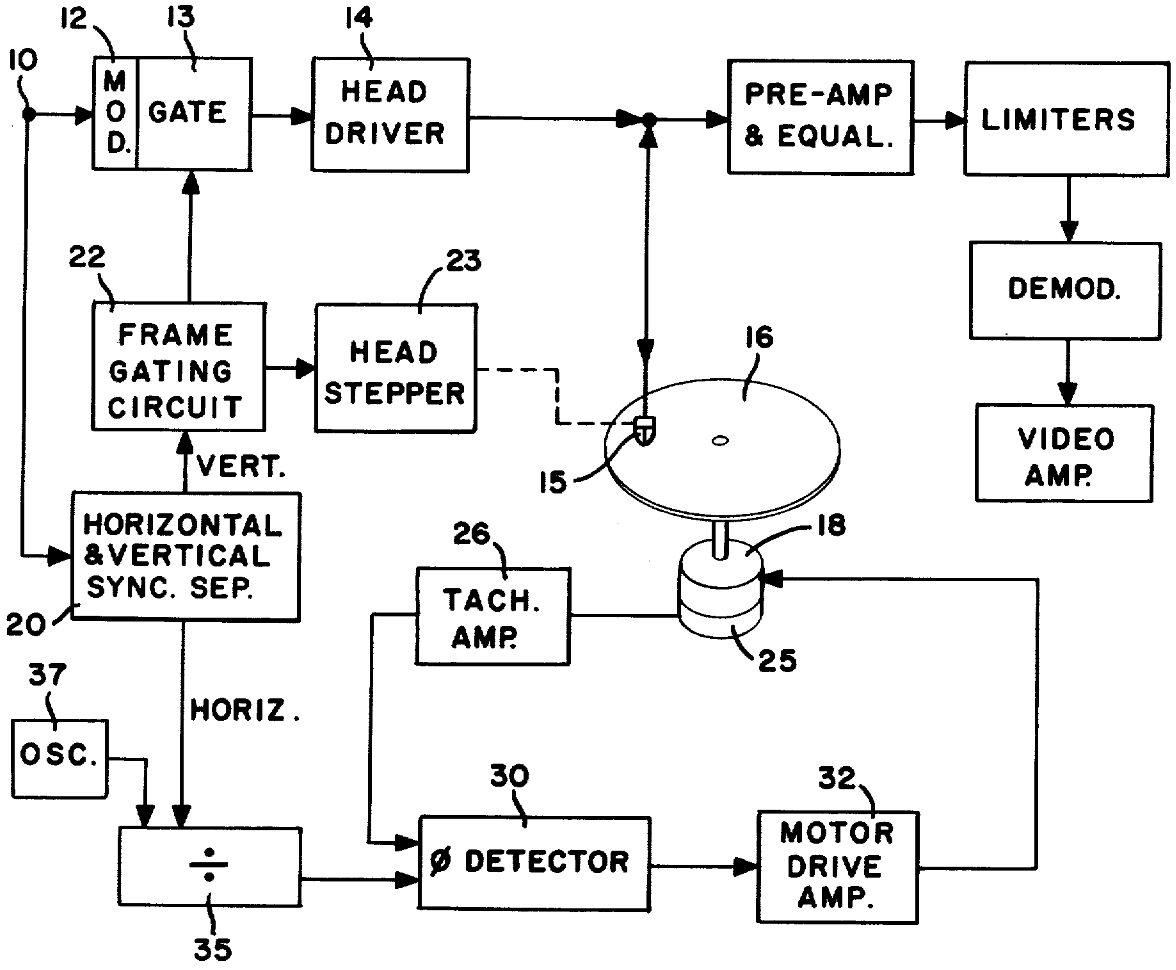
FIG. 1 is a block diagram of a typical video recording system employing a disc recording media, to which the present invention applies.

Referring to FIG. 1, the input terminal 10 is adapted to receive the video signal to be recorded. This signal may be from one of several types of video cameras, as previously described, or from a receiver operating from a broadcast signal. This signal is connected to two circuits, namely a modulator circuit 12 and gate circuit 13 which controls the application of the video signal to the head driver circuits or amplifier 14. The head driver in turn applies the circuit to the magnetic transducer 15 which cooperates with the recording media, in this case a disc 16 of magnetic recording tape which is rotated by a suitable DC servo motor 18, preferably at a rate of 1,800 revolutions per minute.

The other path for the incoming video signal is to a conventional sync separator circuit 20 which separates the horizontal and vertical synchronizing information from the video signal. The vertical sync information is applied to a frame gating control circuit 22 which in turn controls the gate circuit 13 for the video signal to be recorded, and which may also be used to control a head stepper circuit 23 which is connected as shown schematically to reposition the transducer 15 to follow a different circular path for each frame of video signal to be recorded.

Since the vertical blanking interval appears at the end of each field, or twice each frame, the conventional arrangement in a single frame recording unit is to actuate the frame gating circuit 22 when recording is desired, at which time it will enable gate circuit 13 upon occurrence of the next separated vertical sync circuit, and continue to enable the gate circuit 13 until the frame gating circuit receives two more vertical sync signals, at which time the gage circuit 13 will be disabled. During the interval that the gate circuit 13 is enabled the incoming video signal for one complete frame will be applied to the recording transducer through the head driver circuits 14. Since the disc makes thirty revolutions per second, and the frame rate is the same, a single frame will be recorded within one revolution of the recording disc 16, and then the transducer may be moved automatically or manually to a different circular track. The playback circuits are appropriately labelled but not described since they are not a direct part of the invention.

The speed of the motor 18 is closely controlled by a closed servo loop which locks the motor speed to the scanning frequency of the incoming video signal. A tachometer 25 is driven from motor 18, and its output is connected through the tachometer amplifier 26 to a phase detector circuit 30. The output of the phase detector circuit is in turn connected to the motor drive amplifier 32 which controls the power supply to the DC motor 18, regulating its rotational speed. The comparison input to the phase detector 30 is provided with a divider circuit 35 which receives inputs alternatively from the sync separator circuit 20, during recording, and from a precision oscillator circuit 37, during playback. The sync separator circuit supplies the separated horizontal sync signals to the divider circuit 35, and these are in turn divided to a frequency comparable to the output of the tachometer 25.

Since the video recording equipment should be compatible with broadcast video signals, the criteria for handling such signals establish certain parameters for the equipment. Broadcast video signals are, by standard, at 525 lines per frame, using interlaced fields at a field rate of 60Hz. This means that the time required to record a single frame of broadcast video information is one-thirtieth of a second. The movement of the recording media can therefore conveniently be driven directly by a motor operating at thirty revolutions per second. Particularly in disc type recorders, this means that a single frame can be recorded in a circular track during one revolution of the disc.

In the standard broadcast video signal format, the horizontal sync frequency for a 525 line frame is 15,750Hz. One integer divisor of that frequency is 175. A tachometer is chosen having a rate of 175 pulses per revolution, which at the desired thirty revolution per second speed provides an output from the tachometer amplifier 26 of 5,250Hz. The stripped horizontal sync frequency from the sync separator circuit 20 may then be divided by three in the divider circuit 35 to provide a corresponding output at 5,250Hz to the phase comparator circuit 30. That circuit, according to known principles, provides a difference output until the two inputs to it correspond, thereby adjusting the motor speed precisely into synchronizm with the incoming video signal.

By choosing the above mentioned tachometer frequency, and by employing a special type of divider circuit 35, it is possible to accommodate automatically other video signals which have line rates that are certain multiples of the tachometer pulse rate. In the particular example given, a line rate of 875 lines per frame, one of the recommended standards for high resolution video signals, is such a multiple.

Figure 2:
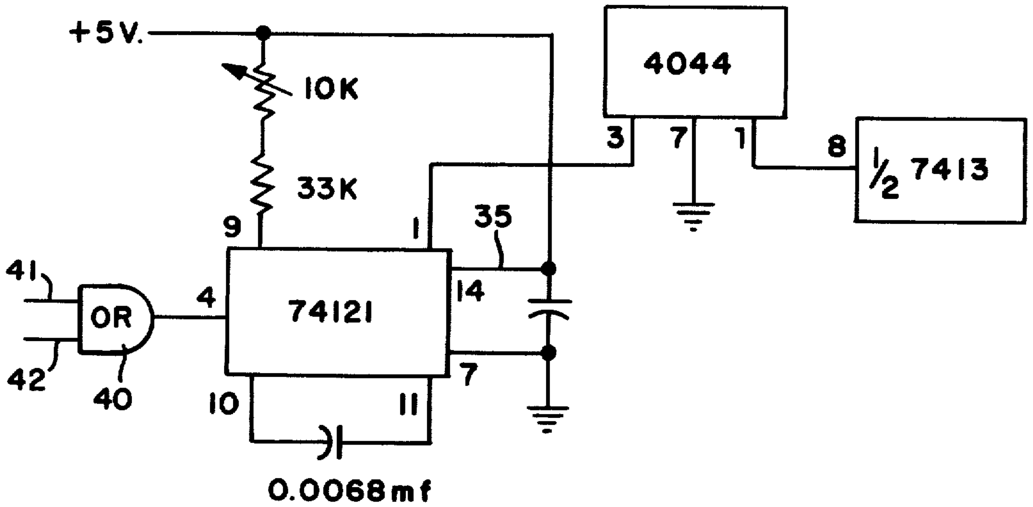
FIG. 2 is a logic diagram illustrating details of the features of the invention.

FIG. 2 is a circuit logic diagram showing conventional integrated circuits and related components to provide a divider circuit 35 of the desired type. An OR gate 40 acts as a buffer to the divider circuit input, receiving either the horizontal sync signal from the sync separator circuit 20 at its input line 41, or sync signals from the crystal oscillator circuit 37 at its other input 42. The divider circuit itself is a monolithic TTL monostable multivibrator, type 74121, which has an external timing capacitor (0.0068mf) attached between pins 10 and 11, and an external resistance comprising a 33K resistor and a 10K potentiometer connected between its pins 9 and 14. These values are selected to obtain an output pulse width sufficient to provide a divider output of 5,250Hz regardless of whether the input at input line 41 is three times, four times, or even five times that frequency. The output from the multivibrator circuit is from pin 1 and it is connected to a type 4044 phase comparator, the other input of which is from Schmitt trigger circuit type 7143 which in turn is part of the tachometer amplifier and its output.

Thus, the divider circuit 35, using the type 74121 monostable multivibrator with external timing components, is capable of dividing the input to it by any integer which is a multiple of its desired output. Therefore, if a broadcast specific video signal, or a corresponding 525/60 closed circuit video camera is employed as an input, the divider circuit 35 will divide by three. If any higher line rate is used, as from a high resolution closed circuit camera, the divider circuit will automatically divide the incoming sync signal appropriately to provide the comparison signal to the servo loop for the motor 18. For example, in the case of a high resolution camera operating at the 875/60 format, the divider circuit will divide by five and provide the requisite 5,250Hz comparison signal to the phase detector. It will do the same with respect to any other signal operating at a line rate which is an integer multiple of 175, for example it would automatically accommodate a line rate of 1,050.

The foregoing values are given by way of example only, and are not intended to be limiting, since it is well recognized that other standards for broadcast video signals are applicable in some localities outside the United States. However, the invention obviously is equally useful with other related but different line rates and video signal formats.

While the form of apparatus herein described constitutes a preferred embodiment of the invention, it is to be understood that the invention is not limited to this precise form of apparatus and that changes may be made therein wothout departing from the scope of the invention which is defined in the appended claims.

What is claimed is:

1. In a single frame video recorder having transducer means for recording and playback of video signals having different horizontal sync frequencies which are related as different multiples of a base frequency, a magnetic recording media, means including a drive motor and controller for moving said media past said transducer means at a predetermined speed, an input terminal for video signals to be recorded, a gating circuit connected to control the application of signals from said input terminal to said transducer means, a tachometer driven by said motor and providing an output signal at a predetermined base frequency, a sync separator circuit connected to said input terminal and operative to separate horizontal synchronizing information from the input signal, and a phase detector receiving said output signal from said tachometer and providing corrective drive signals to said motor controller;

the improvement comprising a divider circuit having a horizontal sync input from said sync separator circuit and an output which is an integral submultiple of said horizontal sync and is equal to said base frequency, said output being connected to said phase detector.

2. A recorder as defined in claim 1, said divider circuit being an oscillator having a time constant such that its output frequency is limited to said base frequency.

3. A recorder as defined in claim 2, wherein said divider circuit is arranged to receive inputs of different but related high frequencies corresponding to different line rates and to divide all such inputs to the base frequency.

4. In a single frame video recorder having transducer means for recording and playback of video signals having different but related line rates, a magnetic recording media, means including a drive motor and controller for moving said media past said transducer means at a predetermined speed, an input terminal for video signals to be recorded, a gating circuit connected to control the application of signals from said input terminal to said transducer means, a tachometer driven by said motor and providing an output signal at a predetermined base frequency, a sync separator circuit connected to said input terminal and operative to separate horizontal synchronizing information from the input signal, a phase detector receiving said output signal from said tachometer and providing corrective drive signals to said motor controller, the improvement comprising a divider circuit having an input from said sync separator circuit and an output to said phase detector, said divider circuit being arranged to divide horizontal sync inputs at different related frequencies down to the same output base frequency.

* * * * *